United States Patent Office 3,300,484
Patented Jan. 24, 1967

3,300,484
PROCESS AND INTERMEDIATES FOR MANUFACTURE OF 13 - ALKYL - 3,17 - BISOXYGENATED GONA-1,3,5(10)-TRIENES
Raphael Pappo, Skokie, Ill., assignor to G. D. Searle & Co., Chicago, Ill., a corporation of Delaware
No Drawing. Filed Dec. 26, 1963, Ser. No. 333,657
18 Claims. (Cl. 260—239.5)

The present invention is concerned with a novel process utilizing novel intermediates for the manufacture of 13-alkyl - 3,17 - bisoxygenated gona-1,3,5(10)-trienes which can be represented by the structural formula

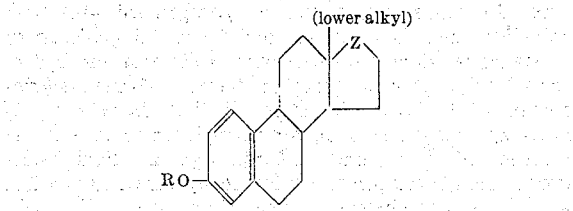

wherein R is hydrogen, a lower alkyl or tetrahydropyran-2-yl group, Z is a carbonyl or hydroxymethylene radical, and the lower alkyl groups comprehended in that representation are typified by methyl, ethyl, isopropyl, tertiary-butyl, pentyl, and hexyl, i.e., those radicals containing fewer than 7 carbon atoms.

The novel intermediates of the present invention are illustrated by the following structural formulas

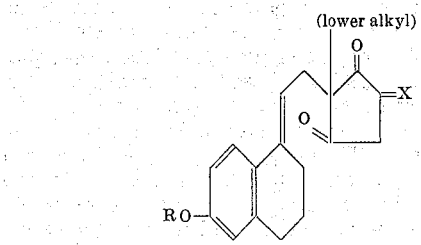

and

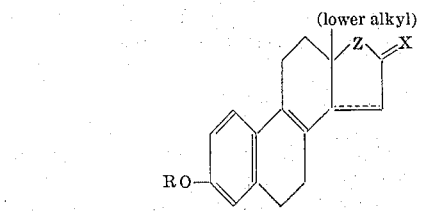

wherein X can be a hydrazono, carbo-lower alkoxy)hydrazono, semicarbazono, hydroxyimino, (lower alkylene)-dioxy, bis(lower alkoxy), ower alkylene)dithio, oxo or

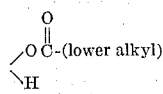

moiety, R is hydrogen or a lower alkyl or tetrahydropyran-2-yl radical, Z is a carbonyl or β-hydroxymethylene group, and the dotted line indicates the optional presence of a 14,15 doubly-bonded linkage. The lower alkylene groups represented in the foregoing formulas are exemplified by methylene, ethylene, trimethylene, tetramethylene, and pentamethylene, i.e., those radicals containing fewer than six carbon atoms. The lower alkoxy groups are typified by methoxy, ethoxy, propoxy, butoxy, pentyloxy, hexyloxy, and the branched-chain groups isomeric therewith.

Starting materials suitable for the practice of this invention are the 3-oxygenated 1-vinyl-1-tetralols of the following formula

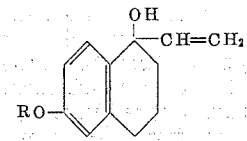

wherein R has the identical meaning designated hereinbefore, and the 2-(lower alkyl)cyclopentane-1,3,4-triones represented by the structural formula

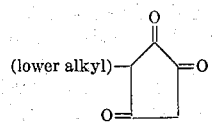

When the latter triketones are allowed to react with one molecular equivalent of a suitable carbonyl reagent, the 4-keto group can be selectively transformed to produce the desired derivative. As a specific example, the reaction of 2-methylcyclopentane-1,3,4-trione with one mole of carbethoxyhydrazine in aqueous acetic acid affords the corresponding 4-carbethoxyhydrazone.

The foregoing 1-[β-(3-substituted-1-alkyl-2,5-dioxocyclopentane)ethylidene] - 6-oxygenated-1,2,3,4-tetrahydronaphthalene intermediates are obtained by reaction of the aforementioned starting materials as is shown below:

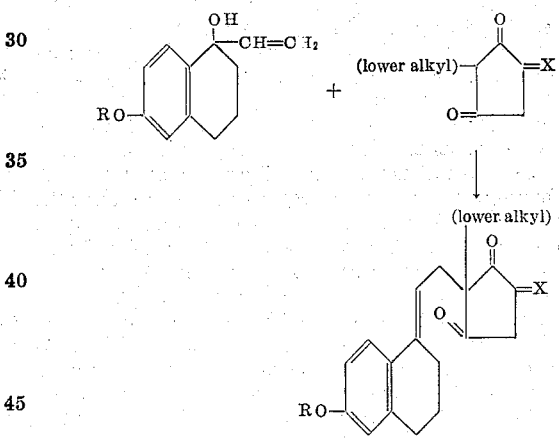

By this process, for example, there is reacted 6-methoxy-1-vinyl-1-tetralol with 2-methylcyclopentane-1,3,4-trione 4 - carbethoxyhydrazone to afford 1-[β-(3-carbethoxyhydrazono - 1-methyl-2,5-dioxocyclopentano)ethylidene]-6-methoxy - 1,2,3,4-tetrahydronaphthalene. Cyclodehydration of those substituted tetrahydronaphthalenes results in the gona-1,3,5(10),8(9),14-pentaene intermediates of the formula

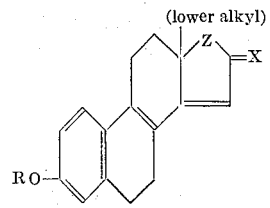

That process is catalyzed by acids or acidic dehydrating reagents. Specific examples of suitable reagents are hydrogen chloride, p-toluenesulfonic acid, formic acid, phosphoric acid, and phosphorous pentoxide. Typical of this process is the reaction of the aforementioned 1-[β-(3-carbethoxyhydrazono - 1 - methyl - 2,5-dioxocyclopentano)-ethylidene]-6-methoxy-1,2,3,4-tetrahydronaphthalene with hydrochloric acid in methanol to yield 3-methoxyestra-1,3,5(10),8(9),14 - pentaene-16,17-dione 16-carbethoxyhydrazone. Selective reduction of the latter gona-1,3,5(10),8(9),14-pentaenes affords the corresponding gona-1,3,5(10),8(9)-tetraenes. That conversion is most conveniently accomplished by means of catalytic hydrogenation, suitable catalysts being palladium and platinum. The hydrogenation of 3-methoxyestra-1,3,5(10),8(9),14-pentaene-16,17-dione 16-carbethoxyhydrazone, for example, in ethanol solution over 5% palladium-on-calcium carbonate catalyst produces 3-methoxyestra-1,3,5(10),8(9)-tetraene-16,17-dione 16-carbethoxyhydrazono. Removal of the hydrazono, carbethoxyhydrazono, or semicarbazono function from the latter intermediates is conveniently accomplished by means of the Wolff-Kishner procedure. In that manner, 3-methoxyestra-1,3,5(10),8(9)-tetraene-16,17-dione 16-carbethoxyhydrazone is converted to 3-methoxyestra-1,3,5(10),8(9)-tetraen-17-one by refluxing in ethylene glycol with potassium hydroxide. As is described by H. Smith et al., Experentia, XIX, 394 (1963), the latter 3-oxygenated 13-alkylgona-1,3,5(10),8(9)-tetraen-17-ones can be reduced, typically with lithium in liquid ammonia, to yield the corresponding 3-oxygenated 13-alkylgona-1,3,5(10)-trien-17-ols, which are oxidized, suitably with chromium trioxide, to produce the corresponding 17-ones. Those 17-ones and 17-ols are estrogenic agents, the members wherein the 13-alkyl group is methyl being estrone and estradiol or their 3-ethers. The 17-ones are also intermediates to other useful pharmacological agents. Reaction with lithium acetylide, for example, results in the corresponding 17α-ethynyl-17β-ols which possess potent progestational properties. Reaction with an alkyl Grignard reagent, on the other hand, yields the 17-alkyl-17β-ols which exhibit useful anabolic activity.

The 16-hydroxyimino intermediates of the present invention are converted to the aforementioned 3-oxygenated-13-alkylgona-1,3,5(10),8(9)-tetraen-17-ols by reduction of the 17-keto group to 17β-hydroxy, hydrolysis of the oxime function to produce the 16,17β-ketol, reaction with an alkanedithiol such as 1,3-propanedithiol to produce the 17β-hydroxy-16-one 1,3-propylenedithio ketal, and hydrogenolysis with Raney nickel of the thioketal function to produce the 17β-ol. An alternative method for that conversion involves reaction of the 16-hydroxyimino-17-ketone with zinc and acetic acid to afford the 16,17β-ketol. By that series of reactions, 3-methoxyestra-1,3,5(10),8(9)tetraene-16,17-dione 16-oxime is converted to estra-1,3,5(10),8(9)-tetraene-3,17β-diol 3-methyl ether. When the protecting group at the 16-position is a ketal function, that moiety is removed by conversion to a thioketal and subsequent treatment as described above. The reaction of 17β-hydroxy-3-methoxyestra-1,3,5(10),8(9)-tetraen-16-one ethylene ketal, for example, with 1,3-propanedithiol yields 17β-hydroxy-3-methoxyestra-1,3,5(10),8(9)-tetraen-16-one 1,3-propylenedithioketal.

When the aforementioned 2-alkylcyclopentane-1,3,4-triones are reacted directly with the 3-oxygenated 1-vinyl-1-tetralols described above, reaction occurs selectively at the 2-position to afford the 1-[β-(1-alkyl-2,3,5-trioxocyclopentano)ethylidene] - 6-oxygenated 1,2,3,4-tetrahydronaphthalenes of the formula

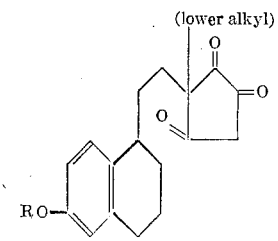

Cyclodehydration of those substances affords the corresponding 13-alkyl-3-oxygenated gona-1,3,5(10),8(9),14-pentaene-16,17-diones. Reduction of the 17-ketone group with lithium tri-(tertiary-butoxy) aluminum hydride followed by hydrogenation of the 14,15-double bond over palladium-on-calcium carbonate catalyst results in the aforementioned 16,17β-ketols. Removal of the 16-keto group is accomplished by the procedure described hereinbefore.

The 16-(lower alkanoyl)oxy intermediates of this invention are obtained by the reaction of the aforementioned 6-oxygenated 1-vinyl-1-tetralols with 4-(lower alkanoyl)oxy-2-alkylcyclopentane-1,3-diones. The latter diones are obtained by reduction of the 2-alkylcyclopentane-1,3,4-triones to the 4-hydroxy-1,3-diones, followed by acylation with a lower alkanoic acid in the presence of hydrogen chloride. In that manner, 2-methylcyclopentane-1,3,4-trione is catalytically hydrogenated with 10% palladium-on-carbon catalyst, and the resulting 4-hydroxy substance is allowed to react with acetic acid and hydrogen chloride, thus resulting in 4-acetoxy-2-methylcyclopentane - 1,3 - dione. Reaction of that dione with 6-methoxy-1-vinyl-1-tetralol, for example, in toluene in the presence of triethylamine affords 1-[β-(2,5-dioxo-3-acetoxy-1-methylcyclopentano)ethylidene]-6-methoxy - 1,2,3,4-tetrahydronaphthalene. Cyclodehydration of that substance in methanol with aqueous hydrochloric acid affords 16 - acetoxy - 3 - methoxyestra-1,3,5(10),8(9),14-pentaen-17-one, which is hydrogenated over 5% palladium-on-calcium carbonate catalyst to yield 16-acetoxy-3-methoxyestra-1,3,5(10),8(9)-tetraen-17-one. Removal of the acetoxy group is effected by reaction with zinc in aqueous acetic acid, thus producing 3-methoxyestra-1,3,5(10),8(9)-tetraen-17-one.

As is described hereinbefore, the process and intermediates of the present invention are useful for the manufacture of 3,17-bisoxygenated gona-1,3,5(10)-trienes possessing pharmacological utility and also serving as intermediates to other potent pharmacological agents.

The invention will appear more fully from the examples which follow. These examples are given by way of illustration only and are not to be construed as limiting the invention either in spirit or in scope to the details contained therein, as many modifications in materials and methods will be apparent from that disclosure to those skilled in the art. In these examples, temperatures are given in degrees centigrade (° C.) and quantities of materials in parts by weight unless otherwise noted.

*Example 1*

To a solution of 2.52 parts of 2-methylcyclopentane-1,3,4-trione in 25 parts of methanol is added 10 parts of hydrazine, and the resulting mixture is allowed to stand at room temperature for about one hour. The solvent and excess hydrazine are removed by distillation at room temperature and reduced pressure to afford 2-methylcyclopentane-1,3,4-trione 4-hydrazone.

To a suspension of 14 parts of 2-methylcyclopentane-1,3,4-trione 4-hydrazone in 22 parts of toluene is added 10.2 parts of triethylamine with vigorous stirring. After about 30 minutes at room temperature, a solution of 20.4 parts of 6-methoxy-1-vinyl-1-tetralol in 87 parts of toluene is added. The resulting reaction mixture is heated gradually to reflux temperature, and heating at that temperature together with continued stirring is maintained for about 3 hours, during which time the water of reaction is removed by means of a water separator. At the end of that reflux period the solvent is removed by slow distillation over a period of about 1½ hours, and the residual mixture is cooled, washed successively with 5% aqueous potassium hydroxide and water, dried over anhydrous sodium sulfate, and concentrated to dryness at reduced pressure to yield 1-[β-(2,5-dioxo-3-hydrazono-1-methylcyclopentano)ethylidene] - 6-methoxy-1,2,3,4-tetrahydronaphthalene, represented by the structural formula

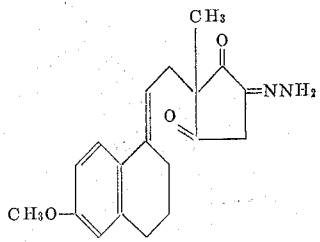

EXAMPLE 2

To a solution of 2.52 parts of 2-methylcyclopentane-1,3,4-trione in 25 parts of methanol containing 5 parts of water is added 2.23 parts of semicarbazide hydrochloride and 3.35 parts of sodium acetate, and the resulting mixture is heated at the reflux temperature for about 5 minutes, then is cooled, and the crystals which form are collected by filtration, then dried to afford 2-methylcyclopentane-1,3,4-trione 4-semicarbazone.

By substituting 18.3 parts of 2-methylcyclopentane-1,3,4-trione 4-semicarbazone and otherwise proceeding according to the process described in Example 1, 1-[β-(2,5-dioxo-1-methyl - 3 - semicarbazonocyclopentano)ethylidene]-6-methoxy-1,2,3,4-tetrahydronaphthalene of the structural formula

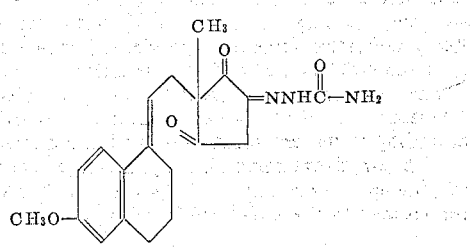

is obtained.

EXAMPLE 3

To a solution of 20 parts of 1-[β-(2,5-dioxo-3-hydrazono - 1 - methylcyclopentano)ethylidene] - 6 - methoxy-1,2,3,4-tetrahydronaphthalene in 120 parts of methanol is added, in a nitrogen atmosphere at room temperature, a solution of 12 parts of concentrated hydrochloric acid in 40 parts of methanol. Stirring at room temperature is continued for about 1½ hours, after which time the reaction mixture is diluted with approximately 300 parts of water, then is neutralized by the addition of 10.2 parts of triethylamine. That aqueous mixture is extracted with benzene, and the organic layer is separated, washed with water, dried over anhydrous sodium sulfate, then stripped of solvent at reduced pressure to yield 3-methoxyestra-1,3,5(10),8(9),14-pentaene-16,17 - dione  16-hydrazone. That substance can be represented by the structural formula

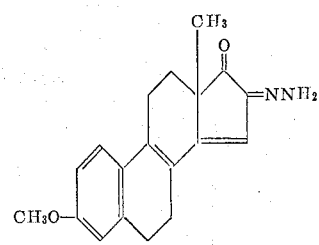

EXAMPLE 4

The substitution of 20 parts of 1-[β-(2,5-dioxo-1-methyl-3-semicarbazono)ethylidene] - 6 - methoxy - 1,2,3,4-tetrahydronaphthalene in the procedure described in Example 3 results in 3-methoxyestra-1,3,5(10),8(9),14-pentaene-16,17-dione 16-semicarbazone of the structural formula

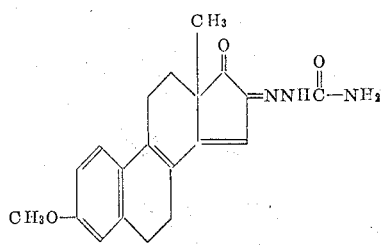

EXAMPLE 5

To a solution of 6 parts of 3-methoxyestra-1,3,5(10),8(9),14-pentaene-16,17-dione 16-hydrazone in 200 parts of ethanol is added 0.6 part of 5% palladium-on-calcium carbonate catalyst, and the resulting mixture is shaken with hydrogen at atmospheric pressure and room temperature until one molecular equivalent of hydrogen is absorbed. The catalyst is then removed by filtration, and the filtrate is evaporated to dryness at reduced pressure, resulting in 3-methoxyestra-1,3,5(10),8(9)-tetraene-16,17-dione 16-hydrazone, which can be represented by the structural formula

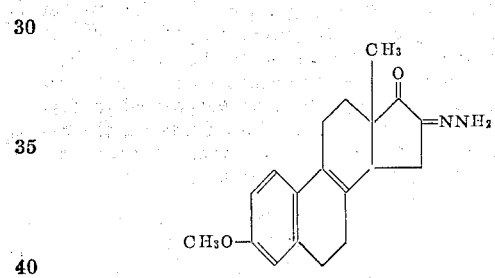

EXAMPLE 6

When 6 parts of 3-methoxyestra-1,3,5(10),8(9),14-pentaene-16,17-dione 16-semicarbazone is hydrogenated by the procedure described in Example 5, the resulting product is 3-methoxyestra-1,3,5(10),8(9)-tetraene-16,17-dione 16-semicarbazone whose structure is illustrated by the following formula

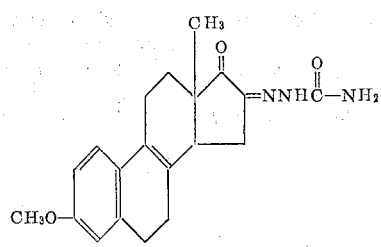

EXAMPLE 7

To a solution of 3 parts of 3-methoxyestra-1,3,5(10),8,(9)-tetraene-16,17-dione 16-hydrazone in 113 parts of ethylene glycol is added 0.6 part of potassium hydroxide, and the resulting reaction mixture is distilled slowly in a nitrogen atmosphere over a period of about 3 hours. The residual mixture is neutralized by the addition of one part of acetic acid, then is concentrated to a small volume at reduced pressure. Dilution of the residue with water affords a mixture which is extracted with benzene, and the benzene layer is separated, washed with water, dried over anhydrous sodium sulfate, then stripped of solvent in vacuo to afford 3-methoxyestra-1,3,5(10),8(9)-tetraen-17-one, represented by the structural formula

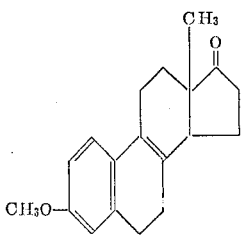

Example 8

The reduction of 3 parts of 3-methoxyestra-1,3,5(10),8(9)-tetraen-16,17-dione 16-semicarbazone by the procedure described in Example 7 results in 3-methoxy-estra-1,3,5(10),8(9)-tetraen-17-one, identical with the product of Example 7.

Example 9

To a solution of 2 parts of 3-methoxyestra-1,3,5(10), 8(9)-tetraene-16,17-dione 16-hydrazone in 160 parts of methanol is added a solution of 0.5 part of sodium borohydride in 50 parts of water, and that reaction mixture is kept at room temperature for about 4 hours. Concentration of the mixture to approximately ⅓ the original volume at reduced pressure and room temperature affords a residue which is extracted with chloroform. The chloroform layer is separated, washed with water, dried over anhydrous sodium sulfate, then evaporated to dryness at reduced pressure to yield 17β-hydroxy-3-methoxy-estra-1,3,5(10),8(9)-tetraen-16-one hydrazone, characterized by the following structural formula

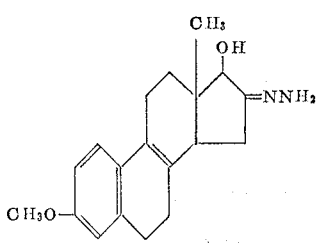

Example 10

By substituting 2 parts of 3-methoxyestra-1,3,5(10), 8(9)-tetraene-16,17-dione 16-semicarbazone and otherwise proceeding according to the processes described in Example 9, 17β-hydroxy-3-methoxyestra-1,3,5(10),8(9)-tetraen-16-one semicarbazone of the structural formula

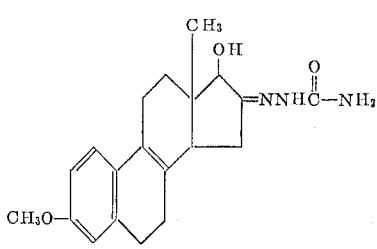

is obtained.

Example 11

The reaction of 3 parts of 17β-hydroxy-3-methoxyestra-1,3,5(10),8(9)-tetraen-16-one hydrazone by the procedure described in Example 7 affords estra-1,3,5(10),8(9)-tetraene-3,17β-diol 3-methyl ether of the structural formula

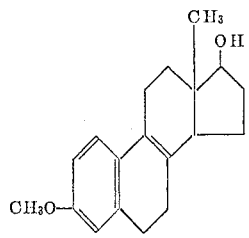

Example 12

By substituting 3 parts of 17β-hydroxy-3-methoxyestra-1,3,5(10),8(9)-tetraen-16-one semicarbazone and otherwise utilizing the procedure of Example 7, there is obtained estra-1,3,5(10),8(9)-tetraene-3,17β-diol 3-methyl ether, identical with the product of Example 11.

Example 13

To a suspension of 1.25 parts of 2-methylcyclopentane-1,3,4-trione in 15 parts of water containing 0.9 part of sodium acetate is added a solution of 0.7 part of hydroxylamine hydrochloride in 4 parts of water, and the resulting mixture is stirred until homogeneous. After standing at room temperature for about one hour, the mixture is filtered, and the resulting crystals are washed with water, then dried to afford 2-methylcyclopentane-1,3,4-trione 4-oxime, melting at about 220° with decomposition. Recrystallization from dioxane yields a pure sample melting at about 228–230° with decomposition.

The reaction of 14.1 parts of 2-methylcyclopentane-1, 3,4-trione 4-oxime with 6-methoxy-1-vinyl-1-tetralol according to the procedure described in Example 1 results in 1-[β-(3-hydroxyimino-1-methyl-2,5-dioxocyclopentano)-ethylidene] - 6-methoxy - 1,2,3,4 - tetrahydronaphthalene, represented by the structural formula

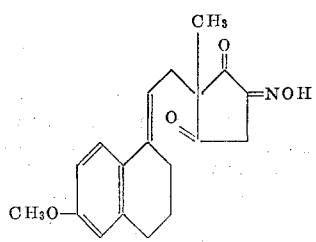

Example 14

The cyclodehydration of 20 parts of 1-[β-(3-hydroxyimino - 1 - methyl - 2,5 - dioxocyclopentano)ethylidene]-6-methoxy-1,2,3,4-tetrahydronaphthalene by the processes described in Example 3 results in 3-methoxyestra-1,3, 5(10),8(9),14-pentaene-16,17-dione 16-oxime, which can be represented by the following structural formula

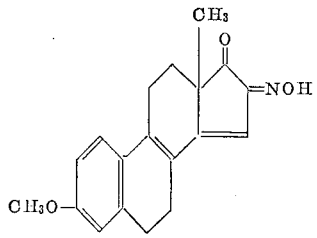

Example 15

By substituting 6 parts of 3-methoxyestra-1,3,5(10), 8(9),14-pentaene-16,17-dione 16-oxime and otherwise following the procedure described in Example 5, 3-methoxyestra-1,3,5(10),8(9)-tetraene-16,17-dione 16-oxime of the structural formula

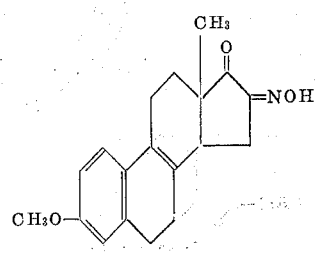

is obtained.

*Example 16*

The reduction of 2 parts of 3-methoxyestra-1,3,5(10), 8(9)-tetraene-16,17-dione 16-oxime by the procedure of Example 9 affords 17β-hydroxy-3-methoxyestra-1,3,5(10), 8(9)-tetraen-16-one oxime.

A mixture of 3.13 parts of 17β-hydroxy-3-methoxyestra-1,3,5(10),8(9)-tetraene-16-one oxime, 2.32 parts of levulinic acid, 0.2 part of p-toluenesulfonic acid monohydrate, and 100 parts of dioxane containing 20 parts of water is allowed to stand at room temperature for about 48 hours, after which time the reaction mixture is neutralized by the addition of aqueous potassium bicarbonate. Concentration of the mixture to a small volume by distillation at reduced pressure affords a residue which is extracted with chloroform. The chloroform layer is separated, washed successively with aqueous sodium hydroxide and water, then dried over anhydrous sodium sulfate and evaporated to dryness in vacuo to afford 17β-hydroxy-3-methoxyestra-1,3,5(10),8(9)-tetraen-16-one, characterized by the structural formula

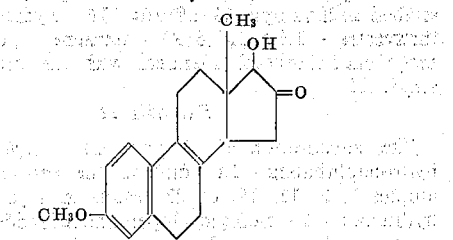

*Example 17*

To a solution of 4 parts of 17β-hydroxy-3-methoxyestra-1,3,5(10),8(9)-tetraen-16-one in 80 parts of benzene is added successively 5 parts of freshly fused zinc chloride and 4.5 parts of 1,3-propanedithiol. Into that reaction mixture is passed a stream of anhydrous hydrogen chloride to the point of saturation, and the reaction mixture is allowed to stand at room temperature for about 2 hours, then is decanted from the precipitated inorganic salts. Washing of that benzene solution successively with dilute aqueous sodium hydroxide and water followed by drying over anhydrous sodium sulfate affords a solution which is stripped of solvent at reduced pressure to yield 17β-hydroxy-3-methoxyestra-1,3,5(10),8(9)-tetraen-16-one 1,3-propylenethioketal. That substance can be represented by the structural formula

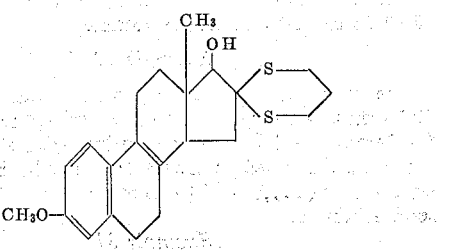

*Example 18*

A mixture of 3 parts of 17β-hydroxy-3-methoxyestra-1,3,5(10),8(9)-tetraen-16-one 1,3-propylenedithioketal with 50 parts of W-6 Raney nickel and 500 parts of dioxane is heated at approximately 100° for about 16 hours.

The nickel catalyst is removed by filtration, and the filter cake is washed thoroughly with dioxane. Removal of the solvent by distillation of the filtrate at reduced pressure affords estra-1,3,5(10),8(9)-tetraene-3,17β-diol 3-methyl ether, identical with the product of Example 11.

*Example 19*

To a solution of 16.8 parts of 1,3-propanedithiol in 105 parts of acetic acid containing one part of anhydrous hydrogen chloride is added 5 parts of 2-methylcyclopentane-1,3,4-trione, and the resulting reaction mixture is allowed to stand at room temperature for about 16 hours. Removal of the solvent by distillation at reduced pressure and room temperature affords a residue. To that residue is added a solution of 3.2 parts of sodium hydroxide in 10 parts of methanol containing 10 parts of water, and the mixture is allowed to stand at room temperature for about 16 hours, then is acidified, at about 5° by means of hydrochloric acid. The acidic mixture is extracted with chloroform, and the organic layer is washed with water, dried over anhydrous sodium sulfate, and stripped of solvent to yield 2-methylcyclopentane-1,3,4-trione 4-(1,3-propylenedithioketal).

The substitution of 21.6 parts of 2-methylcyclopentane-1,3,4-trione 4-(1,3-propylenedithioketal) in the procedure of Example 1 affords 1-{β-[1-methyl-2,5-dioxo-3-(1,3-propylenedithio)cyclopentano]ethylidene} - 6 - methoxy-1,2,3,4-tetrahydronaphthalene, characterized by the structural formula

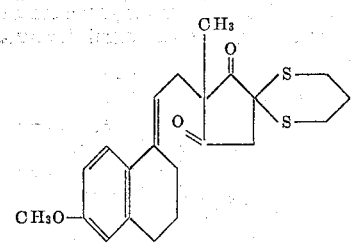

*Example 20*

The cyclodehydration of 24 parts of 1-{β-[1-methyl-2,5 - dioxo - 3 - (1,3-propylenedithio)cyclopentano]ethylidene} - 6 - methoxy-1,2,3,4-tetrahydronaphthalene by the processes described in Example 3 results in 3-methoxyestra-1,3,5(10),8(9),14-pentaene-16,17-dione 16-(1,3-propylenedithioketal). That substance can be represented by the following structural formula

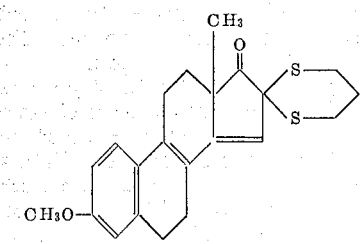

*Example 21*

The hydrogenation of 7 parts of 3-methoxyestra-1,3,5(10),8(9),14 - pentaene-16,17-dione 16-(1,3-propylenedithioketal) according to the procedure of Example 5 results in 3-methoxyestra-1,3,5(10),8(9)-tetraene-16,17-dione 16-(1,3-propylenedithioketal), represented by the structural formula

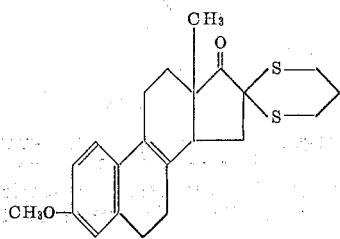

Example 22

When 2.4 parts of 3-methoxyestra-1,3,5(10),8(9)-tetraene-16,17-dione 16-(1,3-propylenedithioketal) is reduced, using the procedure described in Example 9, there is obtained 17β-hydroxy-3-methoxyestra-1,3,5(10),8(9)-tetraen-16-one 1,3-propylenedithioketal. That substance is identical with the product of Example 17.

Example 23

A mixture consisting of one part of 2-methylcyclopentane-1,3,4-trione, 5.7 parts of ethylene glycol, 0.1 part of p-toluenesulfonic acid monohydrate, and 176 parts of benzene is distilled slowly over a period of about 3 hours, during which time approximately ½ of the solvent is removed. Removal of the remaining volatile materials by distillation at reduced pressure affords a residue to which is added a solution of 0.64 part of sodium hydroxide in 2 parts of methanol containing 2 parts of water. The resulting mixture is kept at room temperature for about 16 hours, then is cooled to 0–5° and made acidic by the addition of hydrochloric acid. Extraction of the aqueous mixture with chloroform affords an organic solution which is washed with water, dried over anhydrous sodium sulfate and stripped of solvent, resulting in 2-methylcyclopentane-1,3,4-trione 4-ethyleneketal.

By substituting 17 parts of 2-methylcyclopentane-1,3,4-trione 4-ethyleneketal and otherwise utilizing the procedure described in Example 1, there is obtained 1-[β-(3-ethylenedioxy - 1 - methyl-2,5-dioxocyclopentano)ethylidene]-6-methoxy-1,2,3,4 - tetrahydronaphthalene, which can be represented by the structural formula

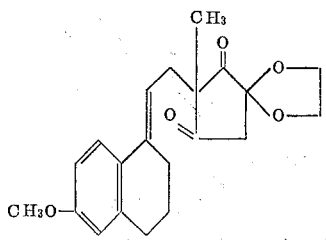

Example 24

A solution of 20 parts of 1-[β-(3-ethylenedioxy-1-methyl - 2,5 - dioxocyclopentano)ethylidene] - 6 - methoxy-1,2,3,4-tetrahydronaphthalene in 160 parts of methanol containing 3 parts of anhydrous hydrogen chloride is kept at room temperature for about 1½ hours, then is cooled to 0–5° and neutralized by the addition of 11 parts of anhydrous sodium carbonate. The inorganic salts are removed by filtration, and the filtrate is stripped of solvent by distillation at reduced pressure and room temperature. The resulting residue is extracted with benzene, and the benzene layer is separated, washed with water, dried over anhydrous sodium sulfate, and concentrated to dryness in vacuo to produce 3-methoxyestra-1,3,5(10),8(9),14-pentaene-16,17-dione 16-ethyleneketal, whose structure is illustrated by the following representation

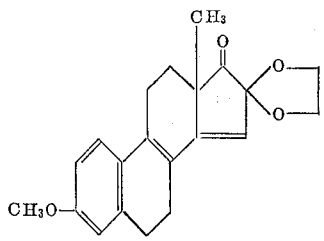

Example 25

The hydrogenation of 6.6 parts of 3-methoxyestra-1,3,5(10),8(9),14 - pentaene - 16,17 - dione 16-ethyleneketal by the procedure described in Example 5 affords 3-methoxyestra - 1,3,5(10),8(9) - tetraene - 16,17 - dione 16-ethyleneketal, which can be represented by the following structural formula

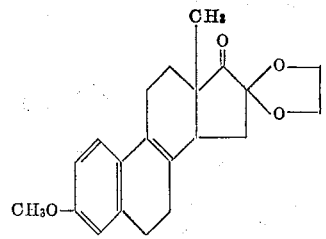

Example 26

When 2.2 parts of 3-methoxyestra-1,3,5(10),8(9)-tetraene-16,17-dione 16-ethyleneketal is reduced by the procedure described in Example 9, there is obtained 17β-hydroxy - 3 - methoxyestra - 1,3,5(10),8(9) - tetraene-16-one ethyleneketal, represented by the structural formula

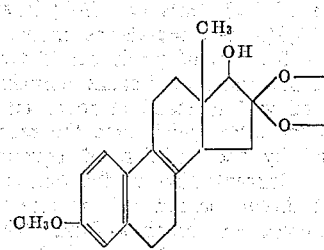

Example 27

The reaction of 12.9 parts of 17β-hydroxy-3-methoxyestra - 1,3,5(10),8(9) - tetraene - 16 - one ethyleneketal with 5.6 parts of 1,3-propanedithiol by the procedure described in Example 19 affords 17β - hydroxy - 3 - methoxyestra - 1,3,5(10),8(9) - tetraene - 16 - one 1,3-propylenedithioketal, identical with the product of Example 22.

Example 28

The substitution of 19 parts of 1-vinyl-1,2,3,4-tetrahydronaphthalene - 1,6 - diol in the procedures of Examples 1, 2, 13, 19, or 23 results in 1-[β-(2,5-dioxo-3-hydrazono - 1 - methylcyclopentano)ethylidene] - 6 - hydroxy - 1,2,3,4 - tetrahydronaphthalene, 1 - [β - (2,5-dioxo - 1 - methyl - 3 - semicarbazonocyclopentano)ethylidene] - 6 - hydroxy - 1,2,3,4 - tetrahydronaphthalene, 1 - [β - (3 - hydroxyimino - 1 - methyl - 2,5 - dioxocyclopentano)ethylidene] - 6 - hydroxy - 1,2,3,4 - tetrahydronaphthalene, 1 - {β - [1 - methyl - 2,5 - dioxo - 3 - (1,3-propylenedithio)cyclopentano]ethylidene} - 6 - hydroxy-1,2,3,4 - tetrahydronaphthalene, and 1 - [β - (3 - ethylenedioxy - 1 - methyl - 2,5 - dioxocyclopentano)ethylidene] - 6 - hydroxy - 1,2,3,4 - tetrahydronaphthalene, respectively.

Example 29

By substituting an equivalent quantity of 1-[β-(2,5-dioxo - 3 - hydrazono - 1 - methylcyclopentano)ethylidene]-6-hydroxy-1,2,3,4-tetrahydronaphthalene and otherwise proceeding according to the processes described in Example 3, 3 - hydroxyestra - 1,3,5(10),8(9),14 - pentaene-16,17-dione 16-hydrazone is obtained.

Example 30

The substitution of an equivalent quantity of 1-[β-(2,5 - dioxo - 1 - methyl - 3 - semicarbazono)ethylidene]-6 - hydroxy - 1,2,3,4 - tetrahydronaphthalene in the processes described in Example 3 results in 3-hydroxyestra - 1,3,5(10),8(9),14 - pentaene - 16,17 - dione 16-semicarbazone.

Example 31

By substituting an equivalent quantity of 1-[β-(3-hydroxyimino - 1 - methyl - 2,5 - dioxocyclopentano)ethylidene] - 6 - hydroxy - 1,2,3,4 - tetrahydronaphthalene and otherwise proceeding according to the processes described in Example 3, 3 - hydroxyestra - 1,3,5(10),8(9), 14-pentaene-16,17-dione 16-oxime is obtained.

Example 32

The substitution of an equivalent quantity of 1-{β-[1-methyl - 2,5 - dioxo - 3 - (1,3 - propylenedithio)cyclopentano]ethylidene} - 6 - hydroxy - 1,2,3,4 - tetrahydronaphthalene in the procedure of Example 3 results in 3-hydroxyestra - 1,3,5(10),8(9),14 - pentaene - 16,17 - dione 16-(1,3-propylenedithioketal).

Example 33

The substitution of an equivalent quantity of 1-[β-(3-ethylenedioxy - 1 - methyl - 2,5 - dioxocyclopentano)-ethylidene] - 6 - hydroxy - 1,2,3,4 - tetrahydronaphthalene in the procedure of Example 3 results in 3-hydroxyestra-1,3,5(10),8(9),14-pentaene-16,17-dione 16-ethyleneketal.

Example 34

To a solution of 70 parts of 1-vinyl-1,2,3,4-tetrahydronaphthalene-1,6-diol in 500 parts of dry benzene is added 40 parts of dihydropyran and 0.5 part of p-toluenesulfonic acid monohydrate. The resulting reaction mixture is kept at room temperature for about one hour, then is washed successively with saturated aqueous sodium bicarbonate and saturated aqueous sodium chloride. The organic layer is separated, dried over anhydrous sodium sulfate and concentrated to dryness to afford 1-vinyl-1,2,3,4 - tetrahydronaphthalene - 1,6 - diol 6 - (2 - tetrahydropyranyl) ether.

The substitution of an equivalent quantity of the latter pyranyl ether in the procedure of Examples 1, 2, 13, 19, or 23 results in 1 - [β - (2,5 - dioxo - 3 - hydrazono-1 - methylcyclopentano)ethylidene] - 6 - (tetrahydropyran - 2 - yloxy) - 1,2,3,4 - tetrahydronaphthalene, 1 - [β - (2,5 - dioxo - 1 - methyl - 3 - semicarbazonocyclopentano)ethylidene] - 6 - (tetrahydropyran - 2 - yloxy) - 1,2,3,4 - tetrahydronaphthalene, 1 - [β - (3 - hydroxyimino - 1 - methyl - 2,5 - dioxocyclopentano)ethylidene] - 6 - (tetrahydropyran - 2 - yloxy) - 1,2,3,4-tetrahydronaphthalene, 1 - {β - [1 - methyl - 2,5 - dioxo - 3 - (1,3 - propylenedithio)cyclopentano]ethylidene} - 6-(tetrahydropyran - 2 - yloxy) - 1,2,3,4 - tetrahydronaphthalene, and 1 - [β - (3 - ethylenedioxy - 1 - methyl - 2,5 - dioxocyclopentano)ethylidene] - 6 - (tetrahydropyran - 2 - yloxy) - 1,2,3,4 - tetrahydronaphthalene, respectively.

Example 35

By substituting an equivalent quantity of 1-[β-(2,5-dioxo-3-hydrazono-1-methylcyclopentano)ethylidene] - 6-(tetrahydropyran - 2 - yloxy) - 1,2,3,4 - tetrahydronaphthalene, 1 - [β - (2,5 - dioxo - 1 - methyl - 3 - semicarbazonocyclopentano)ethylidene] - 6-(tetrahydropyran-2-yloxy)-1,2,3,4 - tetrahydronaphthalene, 1 - [β - (3 - hydroxyimino - 1 - methyl - 2,5 - dioxocyclopentano)ethylidene] - 6 - (tetrahydropyran - 2 - yloxy) - 1,2,3,4 - tetrahydronaphthalene, 1 - {β - [1 - methyl - 2,5 - dioxo - 3 - (1,3-propylenedithio)cyclopentano]ethylidene} - 6 - tetrahydropyran - 2- yloxy) - 1,2,3,4 - tetrahydronaphthalene, or 1 - [β - (3 - ethylenedioxy - 1 - methyl - 2,5 - dioxocyclopentano)ethylidene]-6-(tetrahydropyran - 2 - yloxy) 1,2,3,4 - tetrahydronaphthalene, 3 - (tetrahydropyran - 2-yloxy)estra - 1,3,5(10),8(9),14 - pentaene - 16,17 - dione 16 - hydrazone, 3 - (tetrahydropyran - 2-yloxy)estra-1,3,5 (10),8(9),14 - pentaene - 16,17 - dione 16 - semicarbazone, 3 - (tetrahydropyran - 2 - yloxy)estra - 1,3,5(10), 8(9),14 - pentaene - 16,17 - dione 16 - oxime, 3 - (tetrahydropyran - 2 - yloxy)estra - 1,3,5(10),8(9),14 pentaene 16,17 - dione 16 - (1,3 - propylenedithioketal), and 3 - (tetrahydropyran - 2 - yloxy) - estra - 1,3,5(10),8(9),14 pentaene-16,17-dione 16-ethyleneketal, respectively, are obtained.

Example 36

The substitution of an equivalent quantity of 3-hydroxyestra-1,3,5(10),8(9),14 - pentaene - 16,17 - dione 16-hydrazone, 3-hydroxyestra-1,3,5(10),8(9),14 - pentaene-16, 17-dione 16-semicarbazone, 3 - hydroxyestra - 1,3,5(10), 8(9),14 - pentaene - 16,17 - dione 16 - oxime, 3 - hydroxyestra - 1,3,5(10),8(9),14 - pentaene - 16,17 - dione 16 - (1,3 - propylenedithioketal), or 3 - hydroxyestra-1, 3,5(10),8(9),14 - pentaene - 16,17 - dione 16 - ethyleneketal in the procedure of Example 5 results in 3-hydroxyestra - 1,3,5(10),8(9) - tetraene - 16,17 - dione 16 - hydrazone, 3 - hydroxyestra - 1,3,5(10),8(9) - tetraene - 16, 17 dione 16-semicarbazone, 3-hydroxyestra-1,3,5(10),8(9)-tetraene 16,17-dione 16-oxime, 3-hydroxyestra-1,3,5(10), 8(9) - tetraene - 16,17 - dione 16 - (1,3 - propylenedithioketal) and 3-hydroxyestra-1,3,5(10),8(9)-tetraene-16,17 dione 16-ethyleneketal, respectively.

Example 37

By substituting an equivalent quantity of 3-(tetrahydropyran - 2 - yloxy)estra - 1,3,5(10),8(9),14 - pentaene - 16, 17-dione 16-hydrazone, 3-(tetrahydropyran-2-yloxy)estra-1,3,5(10),8(9),14 - pentaene - 16,17-dione 16-semicarbazone, 3 - (tetrahydropyran-2-yloxy)estra-1,3,5(10),8(9), 14-pentaene-16,17-dione 16-oxime, 3-(tetrahydropyran-2-yloxy)-estra-1,3,5(10),8(9),14-pentaene-16,17-dione 16-(1,3 - propylenedithioketal) or 3 - (tetrahydropyran - 2-yloxy)-estra-1,3,5(10),8(9),14-pentaene-16,17-dione 16-ethyleneketal, 3 - (tetrahydropyran - 2 - yloxy)estra - 1,3, 5(10),8(9) - tetraene - 16,17 - dione 16 - hydrazone, 3-(tetrahydropyran - 2 - yloxy)estra - 1,3,5(10),8(9), - tetraene - 16,17 - dione 16 - semicarbazone, 3 - (tetrahydropyran - 2 - yloxy)estra - 1,3,5(10),8(9) - tetraene - 16,17-dione 16 - oxime, 3 - (tetrahydropyran - 2 - yloxy)estra-1,3,5(10),8(9), - tetraene - 16,17 - dione 16 - (1,3 - propylenedithioketal), and 3 - (tetrahydropyran - 2 - yloxy) estra - 1,3,5(10),8(9) - tetraene - 16,17 - dione 16 - ethyleneketal, respectively, are obtained.

Example 38

The reaction of 43 parts of pentanone-2 with 160 parts of ethyl oxalate according to the procedure described by Orchin and Butz, J. Amer. Chem. Soc., 65, 2296 (1943), affords ethyl 4-ethyl-2,3,5 - triketocyclophentylglyoxylate, which is allowed to react with phosphoric acid according to the procedure described in that publication to afford 2-ethylcyclopentane-1,3,4-trione.

Example 39

Bq substituting 2.8 parts of 2-ethylcyclopentane-1,3,4-trione in the procedure of Examples 1, 2, 13, 19, or 23, 2 - ethylcyclopentane-1,3,4-trione 4-hydrazone, 2-ethylcyclopentane-1,3,4-trione 4-semicarbazone, 2-ethylcyclopentane - 1,3,4 - trione oxime, 2 - ethylcyclopentane - 1,3, 4-trione 4-(1,3-propylenedithioketal), and 2-ethylcyclopentane-1,3,4-trione 4-ethyleneketal, respectively, are obtained.

Example 40

By substituting an equivalent quantity of 2-ethylcyclopentane-1,3,4-trione 4-hydrazone, 2-ethylcyclopentane-1,3, 4-trione 4-semicarbazone, 2-ethylcyclopentane-1,3,4-trione, 4-oxime, 2-ethylcyclopentane-1,3,4 - trione 4 - (1,3-propylenedithioketal) or 2-ethylcyclopentane-1,3,4-trione 4-ethyleneketal, and otherwise proceeding according to the processes described in Example 1, 1-[β-(1-ethyl-3-hydrazono - 2,5 - dioxocyclopentano)ethylidene] - 6 - methoxy-1,2,3,4 - tetrahydronaphthalene, 1 - [β - (1 - ethyl - 2,5-dioxo - 3 - semicarbazonocyclopentano)ethylidene] - 6-methoxy - 1,2,3,4 - tetrahydronaphthalene, 1 - [β - (1-ethyl - 3 - hydroxyimino - 2,5 - dioxocyclopentano)ethylidene] - 6 - methoxy - 1,2,3,4 - tetrahydronaphthalene, 1-{β-[1-ethyl - 2,5 - dioxo - 3 - (1,3 - propylenedithio)cyclopentano]ethylidene} - 6 - methoxy 1,2,3,4 - tetrahydronaphthalene, and 1-[β-1-ethyl-3-ethylenedioxy-2,5-dioxocyclopentano)ethylidene] - 6 - methoxy - 1,2,3,4 - tetrahydronaphthalene, respectively, are obtained.

Example 41

The substitution of an equivalent quantity of 1-[β-(1-ethyl - 3 - hydrazono - 2,5 - dioxocyclopentano)ethylidene] - 6 - methoxy - 1,2,3,4 - tetrahydronaphthalene, 1 - [β - (1 - ethyl - 2,5 - dioxo - 3 - semicarbazonocyclopentano)ethylidene] - 6 - methoxy - 1,2,3,4 - tetrahydronaphthalene, 1 - [β - (1 - ethyl - 3 - hydroxyimino - 2,5-dioxocyclopentano)ethylidene] - 6 - methoxy - 1,2,3,4-tetrahydronaphthalene, 1 - {β - [1 - ethyl - 2,5 - dioxo - 3 - (1,3 - propylenedithio)cyclopentano]ethylidene} - 6-methoxy - 1,2,3,4 - tetrahydronaphthalene, or 1 - [β - (1-ethyl - 3 - ethylenedioxy - 2,5 - dioxocyclopentano)ethylidene] - 6 - methoxy - 1,2,3,4 tetrahydronaphthalene in the procedure of Example 3 results in 13-ethyl-3-methoxygona - 1,3,5(10),8(9),14 - pentaene - 16,17 - dione 16-hydrazone, 13 - ethyl - 3 - methoxygona-1,3,5(10),8,(9), 14 - pentaene - 16,17 - dione semicarbazone, 13 - ethyl-3 - methoxygona - 1,3,5(10),8(9),14 - pentaene - 16,17-dione 16 - oxime, 13 - ethyl - 3 - methoxygona - 1,3,5 (10),8(9),14 - pentaene - 16,17 - dione 16 - (1,3 - propylenedithioketal) and 13-ethyl-3-methoxygona-1,3,5(10), 8(9),14-pentaene-16,17-dione 16 - ethyleneketal, respectively.

Example 42

By substituting an equivalent quantity of 13-ethyl-3-methoxygona - 1,3,5(10),8(9),14 - pentaene - 16,17-dione 16 - hydrazone, 13 - ethyl - 3 - methoxygona - 1,3,5(10), 8(9),14-pentaene - 16,17 - dione 16 - semicarbazone, 13-ethyl-3 - methoxygona - 1,3,5(10),8(9),14 - pentaene - 16, 17 - dione 16 - oxime, 13 - ethyl - 3 - methoxygona - 1,3, 5(10),8(9),14 - pentaene - 16,17 - dione 16 - (1,3 - propylenedithioketal) or 13-ethyl-3-methoxygona-1,3,5(10), 8(9),14 - pentaene - 16,17 - dione 16 - ethyleneketal in the procedure of Example 5, 13-ethyl-3-methoxygona-1,3,5 (10),8(9), - tetraene - 16,17 - dione 16 - hydrazone, 13-ethyl - 3 - methoxygona - 1,3,5(10),8(9), - tetraene - 16, 17 - dione 16 - semicarbazone, 13 - ethyl - 3 - methoxyestra-1,3,5(10),8(9) - tetraene - 16,17 - dione 16 - oxime, 13 - ethyl - 3 - methoxyestra - 1,3,5(10),8(9), - tetraene-16,17 - dione 16 - (1,3 - propylenedithioketal) and 13-ethyl - 3 - methoxyestra - 1,3,5(10),8(9) - tetraene - 16, 17-dione 16-ethylene ketal, respectively, are obtained.

Example 43

By substituting an equivalent quantity of 13-ethyl-3-methoxygona-1,3,5(10),8(9)-tetraene-16,17-dione 16-hydrazone or 13-ethyl-3-methoxygona-1,3,5(10),8(9)-tetraene-16,17-dione 16-semicarbazone and otherwise proceeding according to the processes described in Example 7, 13 - ethyl - 3-methoxygona-1,3,5(10),8,(9)-tetraen-17-one of the structural formula

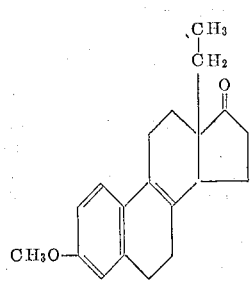

is obtained.

Example 44

The submission of an equivalent quantity of 13-ethyl-3-methoxygona-1,3,5(10),8(9)-tetraene-16,17-dione 16-oxime to the successive processes of Examples 16, 17, and 18 affords 13-ethylgona-1,3,5(10),8(9)-tetraene-3,17β-diol 3-methyl ether, characterized by the structural formula

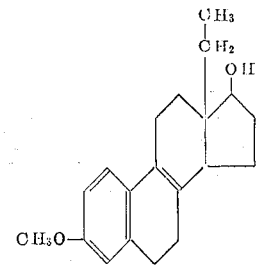

Example 45

The submission of an equivalent quantity of 13-ethyl-3-methoxygona-1,3,5(10),8(9)-tetraene-16,17-dione 16-ethyleneketal to the successive processes described in Examples 26 and 27 affords 13-ethyl-17β-hydroxy-3-methoxygona-1,3,5(10),8(9)-tetraen-16-one 1,3-propylenedithioketal.

Example 46

To a suspension of 1.25 parts of 2-methylcyclopentane-1,3,4-trione in 15 parts of water containing 0.7 part of acetic acid is added, with stirring, one part by volume of carbethoxyhydrazine. The reaction mixture becomes homogeneous after standing for a few minutes, and the carbethoxyhydrazone begins to precipitate soon thereafter. After standing at room temperature for about 20 minutes, the crystalline product is collected by filtration, washed with water, and dried to afford 2-methylcyclopentane-1,3, 4-trione 4-carbethoxyhydrazone, melting at about 205–210° with decomposition. Recrystallization from dioxane affords the pure material as prisms, melting at about 203–204° with decomposition.

Example 47

By substituting an equivalent quantity of 2-methylcyclopentane-1,3,4-trione 4-carbethoxyhydrazone and otherwise proceeding according to the processes described in Example 1, 1-[β-(3-carbethoxyhydrazono-1-methyl-2,5-dioxocyclopentano)ethylidene] - 6-methoxy-1,2,3,4-tetrahydronaphthalene is produced.

Example 48

When an equivalent quantity of 1-[β-(3-carbethoxyhydrazono - 1-methyl-2,5-dioxocyclopentano)-ethylidene]-6-methoxy-1,2,3,4-tetrahydronaphthalene is cyclodehydrated by the procedure described in Example 3, 3-methoxyestra - 1,3,5(10),8(9),14 - pentaene-16,17-dione 16-carbethoxyhydrazone is obtained.

Example 49

The catalytic hydrogenation of an equivalent quantity of 3 - methoxyestra-1,3,5(10),8(9),14-pentaene-16,17-dione 16-carbethoxyhydrazone by the processes described in Example 5 affords 3-methoxyestra-1,3,5(10),8(9)-tetraene-16,17-dione 16-carbethoxyhydrazone.

Example 50

By substituting an equivalent quantity of 3-methoxyestra-1,3,5(10),8(9)-tetraene-16,17-dione 16-carbethoxyhydrazone and otherwise proceeding according to the processes described in Example 7, there is obtained 3-methoxyestra - 1,3,5(10),8(9)-tetraen-17-one, identical with the product of Example 7.

Example 51

To a solution of 1.5 parts of 2-methylcyclopentane-1,3, 4-trione in 168 parts of isopropyl alcohol containing 40 parts of water is added 0.2 part of 10% palladium-on-carbon catalyst, and the resulting hydrogenation mixture is stirred in a hydrogen atmosphere at room temperature until one molecular equivalent of hydrogen is absorbed. The catalyst is then removed by filtration, and the filtrate

17 is concentrated to dryness at reduced pressure to afford 4-hydroxy-2-methylcyclopentane-1,3-dione.

The latter crude dione is dissolved in 25 parts of glacial acetic acid, previously saturated with hydrogen chloride, and the resulting solution is kept at room temperature for about 16 hours. Removal of the solvent by distillation at reduced pressure affords 4-acetoxy-2-methylcyclopentane-1,3-dione.

Example 52

By substituting an equivalent quantity of 4-acetoxy-2-methylcyclopentane-1,3-dione and otherwise proceeding according to the processes described in Example 1, 1-[β-(2,5 - dioxo-3-acetoxy-1-methylcyclopentano)ethylidene]-6-methoxy-1,2,3,4-tetrahydronaphthalene is obtained.

Example 53

The substitution of an equivalent quantity of 1-[β-(2,5 - dioxo-3-acetoxy-1-methylcyclopentano)ethylidene]-6-methoxy-1,2,3,4-tetrahydronaphthalene in the procedure of Example 3 affords 16-acetoxy-3-methoxyestra-1,3,5(10),8(9),14-pentaen-17-one.

Example 54

By substituting an equivalent quantity of 16-acetoxy-3 - methoxyestra - 1,3,5(10),8(9),14-pentaen-17-one and otherwise proceeding according to the procedure of Example 5, 16-acetoxy-3-methoxyestra-1,3,5(10),8(9)-tetraen-17-one is obtained.

Example 55

To a slurry of one part of 16-acetoxy-3-methoxyestra-1,3,5(10),8(9)-tetraen-17-one in 15 parts of water is added 5 parts of zinc and 10 parts of acetic acid, and the resulting reaction mixture is heated at the reflux temperature for about 3 hours. Filtration of the reaction mixture affords a solution which is extracted with chloroform, and the chloroform layer is washed with water, dried over anhydrous sodium sulfate, and stripped of solvent at reduced pressure to afford 3-methoxyestra-1,3,5(10),8(9)-tetraen-17-one, identical with the product of Example 7.

Example 56

The substitution of an equivalent quantity of 2-methylcyclopentane-1,3,4-trione in the procedure of Example 1 results in 1-[β-(1-methyl-2,3,5-trioxocyclopentano)ethylidene]-6-methoxy-1,2,3,4-tetrahydronaphthalene.

Example 57

By substituting an equivalent quantity of 1-[β-(1-methyl-2,3,5-trioxocyclopentano)ethylidene]-6 - methoxy-1,2,3,4-tetrahydronaphthalene and otherwise proceeding according to the process described in Example 3, 3-methoxyestra-1,3,5(10),8(9),14-pentaene-16,17-dione is obtained.

Example 58

To a solution of 2 parts of 3-methoxyestra-1,3,5(10),8(9),14-pentaene-16,17-dione in 30 parts of tetrahydrofuran, cooled to 0–5°, is added with stirring a cooled solution of 3 parts of lithium tri-(tertiarybutoxy) aluminum hydride in 30 parts of tetrahydrofuran. The reaction mixture is stirred for about 20 minutes, then allowed to warm gradually to room temperature and poured into a mixture of ice and water containing excess glacial acetic acid. The resulting aqueous mixture is washed with ether, then made alkaline by the addition of concentrated aqueous sodium carbonate, and extracted with chloroform. The chloroform layer is washed with water, dried over anhydrous sodium sulfate, then stripped of solvent at reduced pressure to afford 17β-hydroxy-3-methoxyestra-1,3,5(10),8(9),14-pentaen-16-one.

18

Example 59

The hydrogenation of an equivalent quantity of 17β-hydroxy-3 - methoxyestra - 1,3,5(10),8(9),14-pentaen-16-one by the procedure described in Example 5 results in 17β-hydroxy-3-methoxyestra - 1,3,5(10),8(9) - tetraen-16-one, identical with the product of Example 16.

What is claimed is:

1. The process which comprises the steps of contacting a compound of the formula

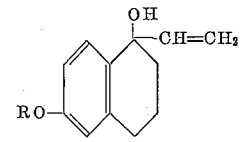

wherein R is selected from the group consisting of hydrogen, lower alkyl, and tetrahydropyran-2-yl, with a compound of the formula

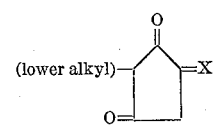

wherein X is a member of the class of radicals consisting of hydrazono, carbethoxyhydrazono, semicarbazono, hydroxyimino, ethylenedioxy, propylenedithio, oxo and

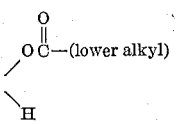

to afford a compound of the formula

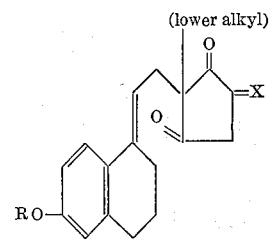

contacting the latter dione with an acidic cyclodehydrating reagent to yield a compound of the formula

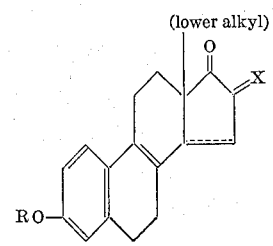

hydrogenating the latter gona-1,3,5(10),8(9),14-pentaene to produce the corresponding gona-1,3,5(10),8(9)-tetraene of the formula

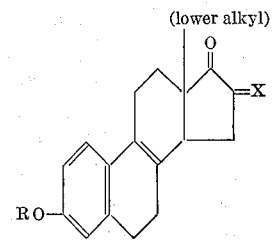

and contacting the latter compound with a reagent capable of removing the group represented by X to yield a compound of the formula

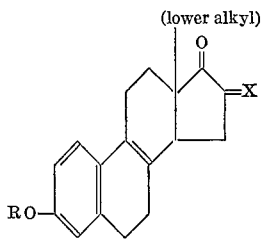

2. The process which comprises the steps of contacting a compound of the formula

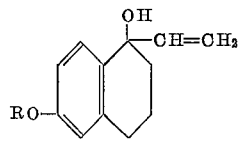

wherein R is selected from the group consisting of hydrogen, lower alkyl, and tetrahydropyran-2-yl with a compound of the formula

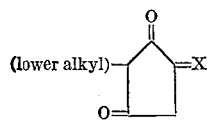

wherein X is a member of the class of radicals consisting of hydrazono, semicarbazono, and carbethoxyhydrazono to afford a compound of the formula

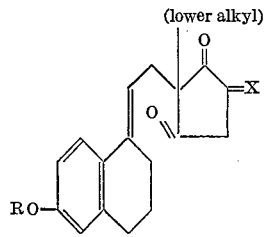

contacting the latter dione with an acidic cyclodehydrating reagent to yield a compound of the formula

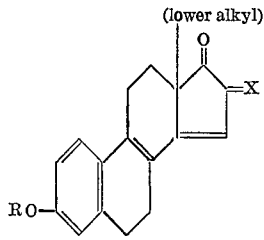

hydrogenating the latter gona-1,3,5(10),8(9),14-pentaene to produce the corresponding gona-1,3,5(10),8(9)-tetraene of the formula

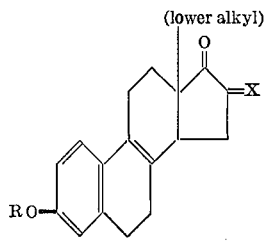

and contacting the latter compound with potassium hydroxide to afford a compound of the formula

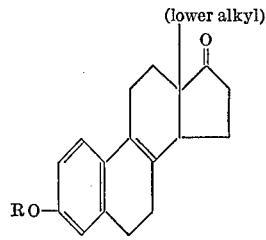

3. The process which comprises the steps of contacting a compound of the formula

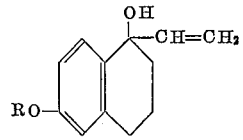

wherein R is selected from the group consisting of hydrogen, lower alkyl, and tetrahydropyran-2-yl, with a compound of the formula

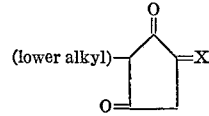

wherein X is a member of the class of radicals consisting of hydrazono, carbethoxyhydrazono, and semicarbazono to afford a compound of the formula

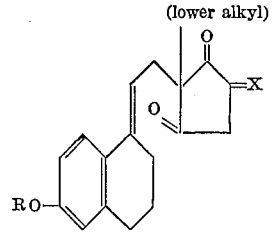

contacting the latter dione with an acidic cyclodehydrating reagent to yield a compound of the formula

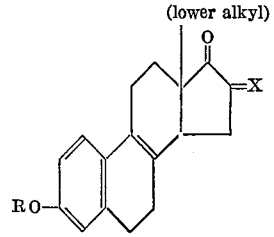

hydrogenating the latter gona-1,3,5(10),8(9),14-pentaene to produce the corresponding gona-1,3,5(10),8(9)-tetraene of the formula

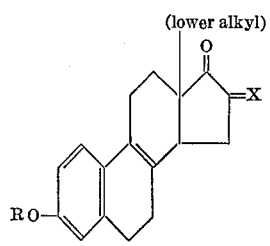

contacting the latter 17-ketone with a reducing agent, resulting in the corresponding 17β-hydroxy substance represented by the formula

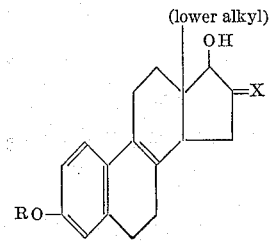

and contacting the latter compound with potassium hydroxide to afford a compound of the formula

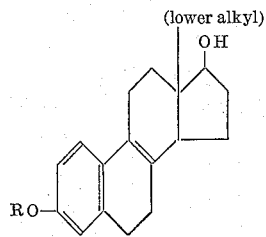

4. The process which comprises the steps of contacting a compound of the formula

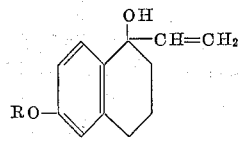

wherein R is selected from the group consisting of hydrogen, lower alkyl, and tetrahydropyran-2-yl, with a compound of the formula

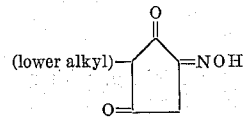

contacting the resulting compound of the formula

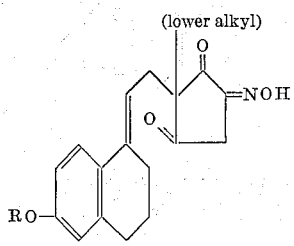

with an acidic cyclodehydrating reagent, contacting the resulting gona-1,3,5(10,8(9),14-pentaene of the formula

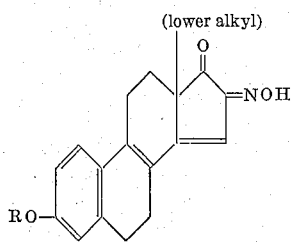

with hydrogen in the presence of a hydrogenation catalyst, contacting the resulting gona-1,3,5(10),8(9)-tetraene of the formula

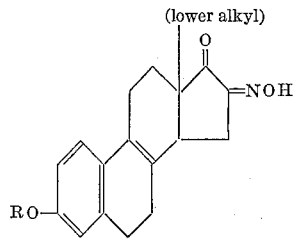

with a reducing agent to afford the corresponding 17β-ol, contacting that 17β-ol with an acidic reagent to yield the corresponding 16,17β-ketol of the formula

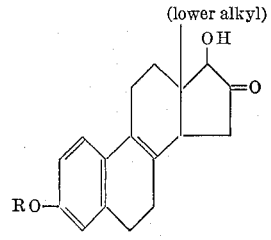

contacting the latter ketol with 1,3-propanedithiol to afford the 16-propylenedithio derivative, and contacting the latter substance with Raney nickel to yield a compound of the formula

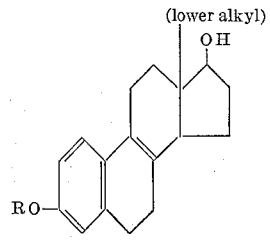

5. The process which comprises the steps of contacting a compound of the formula

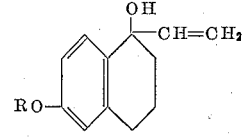

wherein R is selected from the group consisting of hydrogen, lower alkyl, and tetrahydropyran-2-yl, with a compound of the formula

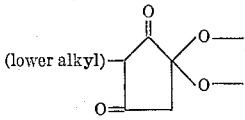

contacting the resulting compound of the formula

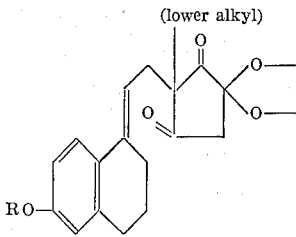

with an acidic cyclodehydrating reagent, contacting the resulting gona-1,3,5(10),8(9),14-pentaene of the formula

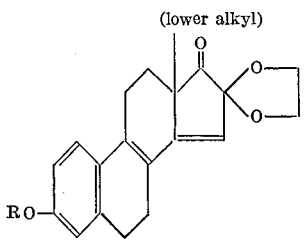

with hydrogen in the presence of a hydrogenation catalyst to yield the gona-1,3,5(10),8(9)-tetraene of the formula

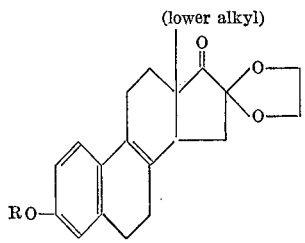

contacting the latter ketal with a reducing agent to afford the corresponding 17β-ol of the formula

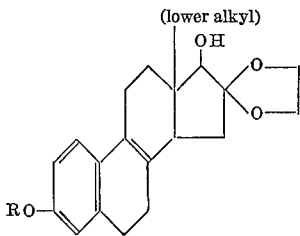

contacting the latter substance with 1,3-propanedithiol to produce the corresponding thioketal of the formula

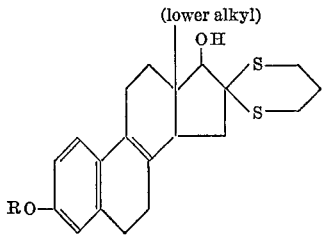

and contacting that thioketal with Raney nickel to yield a compound of the formula

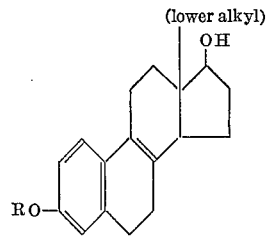

6. The process which comprises the steps of contacting a compound of the formula

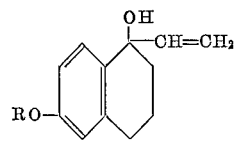

wherein R is selected from the group consisting of hydrogen, lower alkyl, and tetrahydropyran-2-yl, with a compound of the formula

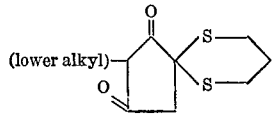

contacting the resulting compound of the formula

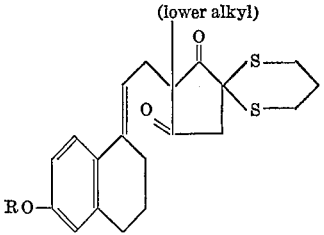

with an acidic cyclodehydrating reagent, contacting the resulting gona-1,3,5(10),8(9),14-pentaene of the formula

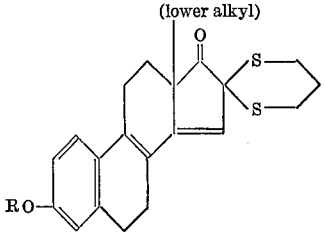

with hydrogen in the presence of a hydrogenation catalyst to yield the gona-1,3,5(10),8(9)-tetraene of the formula

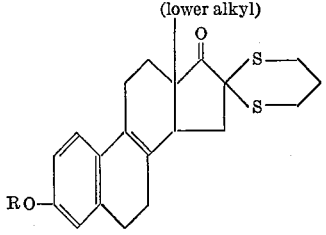

contacting the latter thioketal with a reducing agent to afford the corresponding 17β-ol of the formula

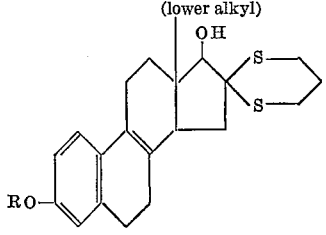

and contacting that thioketal with Raney nickel to yield a compound of the formula

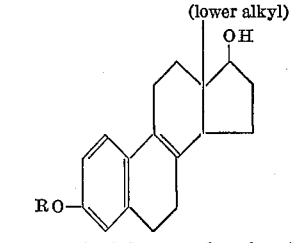

7. The process of claim 2 wherein the group represented by R and lower alkyl is methyl.

8. The process of claim 2 wherein the group represented by R and lower alkyl is methyl, and Z is a carbethoxyhydrazono group.

9. The process of claim 3 wherein the group represented by R and lower alkyl is methyl.

10. The process of claim 4 wherein the group represented by R and lower alkyl is methyl.

11. The process of claim 5 wherein the group represented by R and lower alkyl is methyl.

12. The process of claim 6 wherein the group represented by R and lower alkyl is methyl.

13. A compound of the formula

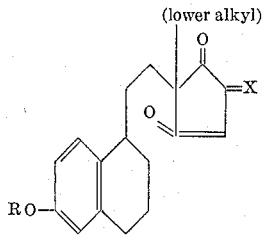

wherein X is a member of the class of radicals consisting of hydrazono, carbethoxyhydrazono, semicarbazono, hydroxyimino, ethylenedioxy, propylenedithio, oxo and

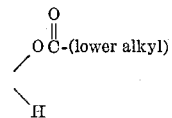

and R is selected from the group consisting of hydrogen, lower alkyl, and tetrahydropyran-2-yl.

14. A compound of the formula

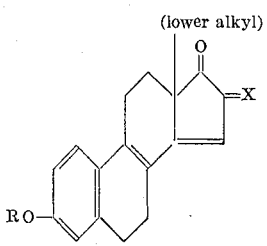

wherein X is a member of the class of radicals consisting of hydrazono, carbethoxyhydrazono, semicarbazono, hydroxyimino, ethylenedioxy, propylenedithio, oxo and

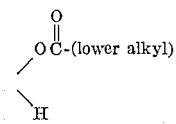

and R is selected from the group consisting of hydrogen, lower alkyl, and tetrahydropyran-2-yl.

15. A compound of the formula

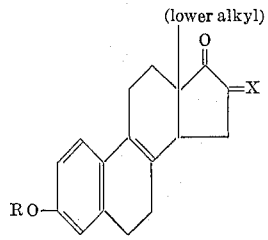

wherein X is a member of the class of radicals consisting of hydrazono, carbethoxyhydrazono, semicarbazono, hydroxyimino, ethylenedioxy, propylenedithio, oxo and

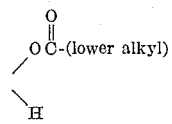

and R is selected from the group consisting of hydrogen, lower alkyl, and tetrahydropyran-2-yl.

16. A compound of the formula

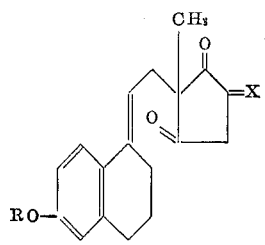

wherein X is a member of the class of radicals consisting of hydrazono, carbethoxyhydrazono, semicarbazono, hydroxyimino, ethylenedioxy, propylenedithio, oxo and

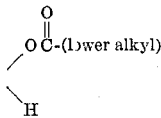

and R is selected from the group consisting of hydrogen, lower alkyl, and tetrahydropyran-2-yl.

17. A compound of the formula

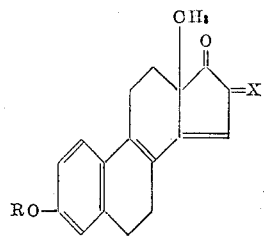

wherein X is a member of the class of radicals consisting of hydrazono, carbethoxyhydrazono, semicarbazono, hydroxyimino, ethylenedioxy, propylenedithio, oxo and

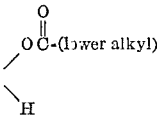

and R is selected from the group consisting of hydrogen, lower alkyl, and tetrahydropyran-2-yl.

18. A compound of the formula

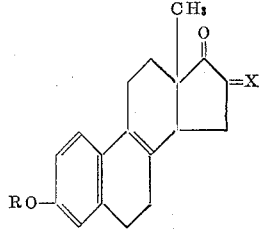

wherein X is a member of the class of radicals consisting of hydrazono, carbethoxyhydrazono, semicarbazono, hydroxyimino, ethylenedioxy, propylenedithio, oxo and

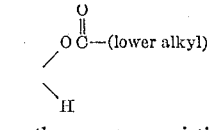

and R is selected from the group consisting of hydrogen, lower alkyl, and tetrahydropyran-2-yl.

References Cited by the Examiner

Windholz et al., "Journal Org. Chem.," Vol. 28, April 1963, pages 1092–1093 relied on.

LEWIS GOTTS, *Primary Examiner.*

ELBERT L. ROBERTS, *Examiner.*